United States Patent [19]
Schneider

[11] Patent Number: 5,373,116
[45] Date of Patent: Dec. 13, 1994

[54] BALANCE

[75] Inventor: Ferdinand Schneider, Dietikon, Switzerland

[73] Assignee: Mettler-Toledo AG, Greifensee, Switzerland

[21] Appl. No.: 31,818

[22] Filed: Mar. 15, 1993

[30] Foreign Application Priority Data

Jun. 10, 1992 [CH] Switzerland ............... 1854/92-4

[51] Int. Cl.$^5$ ................ G01G 23/02; G01G 23/06
[52] U.S. Cl. ............................ 177/154; 177/188
[58] Field of Search ................ 177/187–189, 177/154

[56] References Cited

U.S. PATENT DOCUMENTS

| 3,599,739 | 8/1971 | Hyer. | |
|---|---|---|---|
| 4,420,054 | 12/1983 | Caris. | |
| 4,496,014 | 1/1985 | Willi | 177/187 |
| 4,611,677 | 9/1986 | Yu | 177/187 |

FOREIGN PATENT DOCUMENTS

| 0006237 | 1/1980 | European Pat. Off. . |
| 3242156 | 5/1983 | Germany . |
| 3242156C2 | 10/1991 | Germany . |
| 634655A5 | 2/1983 | Switzerland . |
| 2159966 | 12/1985 | United Kingdom . |

Primary Examiner—George H. Miller, Jr.
Attorney, Agent, or Firm—Friedrich Kueffner

[57] ABSTRACT

A balance with a weighing system protected against overloading includes a load receiving member and a weighing dish placed on the load receiving member. The weighing dish rests on dampening elements which are mounted at ends of two U-shaped levers which are supported in a central yoke. The yoke includes abutments which hold the two levers in a horizontal position in an articulated manner. When a load which is within the weighing range is applied to the weighing dish, the two levers and the yoke form a rigid unit. If an excess load is placed on the weighing dish, either dynamically or statically, the two levers are pivoted and tension a stack of springs mounted in the abutments. In addition to dampening by the pivoting of the two levers and tensioning of the stack of springs, additional dampening is effected by dampening elements between the lever ends and the weighing dish. The levers each have a cross member and stop pedestals mounted underneath the cross member conduct any excess load directly into the housing bottom or legs attached to the housing bottom.

9 Claims, 3 Drawing Sheets

BALANCE

BACKGROUND OF THE INVENTION

1. Field of the Invention

The present invention relates to a balance with a weighing system which is protected against overloading. The weighing system includes a load receiving means and a weighing dish placed on the load receiving means. Two pivotable tilting levers supporting the weighing dish are mounted between the load receiving means and the weighing dish. The tilting levers have outer and inner lever ends, wherein the outer lever ends contact the weighing dish from below and the inner lever ends engage into a vertically displaceable abutment. The abutment is biased by the restoring force of a pre-tensioned spring in such a way that, when an overload is applied, the two tilting levers are pivoted and overcome the force of the spring and form a parallel guide means for the weighing dish which is being lowered.

2. Description of the Related Art

A balance of the above-described type is known from DE-C2-3242156. This reference discloses an overload protection device for a top-loading balance which includes a platform placed on the load receiving means. Two V-shaped and plate-shaped tilting levers rest on the platform. The inner ends of the tilting levers engage under a spring bearing which is arranged axially relative to the load bearing means and is displaceable on the restoring force of a pre-tensioned spring. The weighing dish or a weighing dish support member rests on the outer ends of the tilting levers.

When an overload is applied to the weighing dish, the two tilting levers pivot about the linear support area on the platform and transmit the force acting on the weighing dish into the spring in the abutment or bearing.

This known overload protection device, which is arranged above the measuring cell and outside of the housing, sufficiently protects balances with small nominal loads against damage due to moderate overloading.

In balances having a load range of ten or more kilograms, which additionally for reasons of easy loading must have a structural height which is as low as possible, the above-described overload protection device cannot be utilized in an advantageous manner. On the one hand, the tilting levers which serve as transmission elements and are of sheet metal generally can only transmit small forces or small overloads. On the other hand, the device must be arranged above the weighing cell and, consequently, results in an undesirable increase of the structural height of the balance.

SUMMARY OF THE INVENTION

Therefore, it is the primary object of the present invention to provide a device for securing a balance against overloading, wherein the device is mounted within the balance housing and can be accommodated without increasing the structural height of the balance.

In accordance with the present invention, in a balance of the above-described type, the two tilting levers are constructed as U-shaped, inherently rigid frame members. The flame members have side arms, wherein the ends of the side arms of the two levers are located opposite each other. The side arms can be pivoted about axes which are fastened in a swivel bearing and are located at a distance from the side arm ends. The side arms are connected to a yoke which supports the swivel bearings.

The overload protection according to the present invention makes possible a construction which is stiff with respect to bending, so that the overload protection can also be used in balances for higher loads. The stable construction results in a low sensitivity with respect to corner loads. The overload is always distributed to both frame members because they are coupled to each other at the side arm ends thereof. As a result, even when a load is placed at a corner, both springs are always loaded essentially equally, i.e. within the elasticity thereof.

By providing rubber elements inserted between the frame members and the weighing dish, an excellent dampening of the oscillations created by a dynamically introduced overload can be achieved.

The same frame elements can be used for different load ranges. The adjustment of the load range can be effected by an appropriate selection of the hardness of the spring in the abutment and/or of the pre-tensioning of the spring.

Moreover, by changing the distance of the swivel axes from the abutment, it is possible to change the lever ratio and, thus, the characteristic of the overload protection and to adapt it to the balance.

The overload is preferably absorbed by a stop member which is mounted directly on the bottom of the balance housing. This means that no load is applied to the upper portion of the housing and, thus, the upper portion of the housing does not have to be dimensioned for absorbing an overload. The side walls of the housing and the upper cover of the housing may be very thin and essentially serve as protection against dust and splash water.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DESCRIPTION OF THE PREFERRED EMBODIMENT

Figure 1:
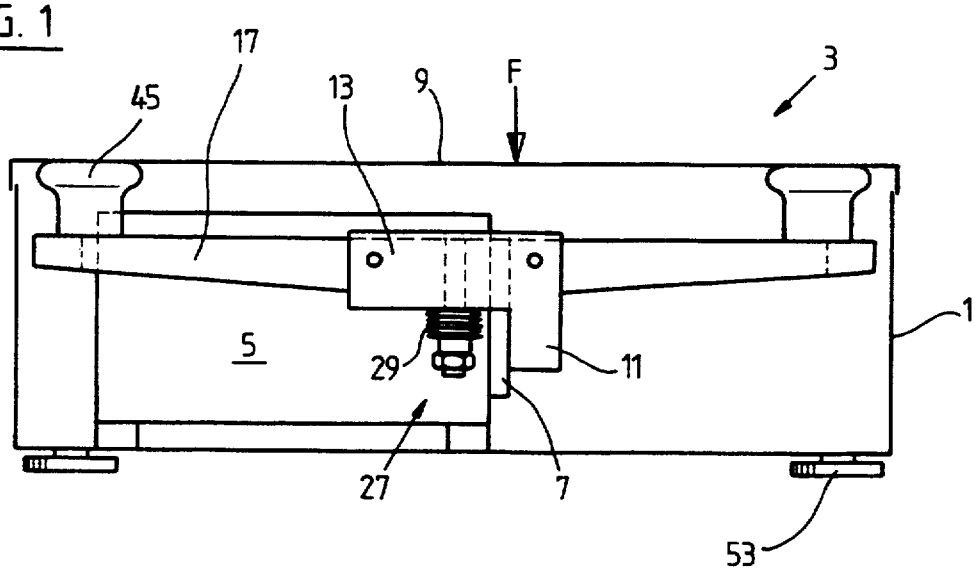
FIG. 1 is a schematic sectional view of a balance according to the present invention.

As illustrated in FIG. 1 of the drawing, a balance 3 has a housing 1 in which is mounted a weighing cell 5 with a load transducer having short measuring travel. A load receiving means 7 can be seen on a side of the weighing cell 5. The load receiving means 7 transmits a force acting on the weighing dish 9 to the weighing cell 5.

A yoke 11 extending over the weighing cell 5 is attached to the load receiving means 7. The yoke 11 has ends each of which is provided with a swivel bearing 13. The ends 15 of arms 39 of two U-shaped levers 17 serving as frames are swingably fastened in the swivel bearings 13.

Figure 2:
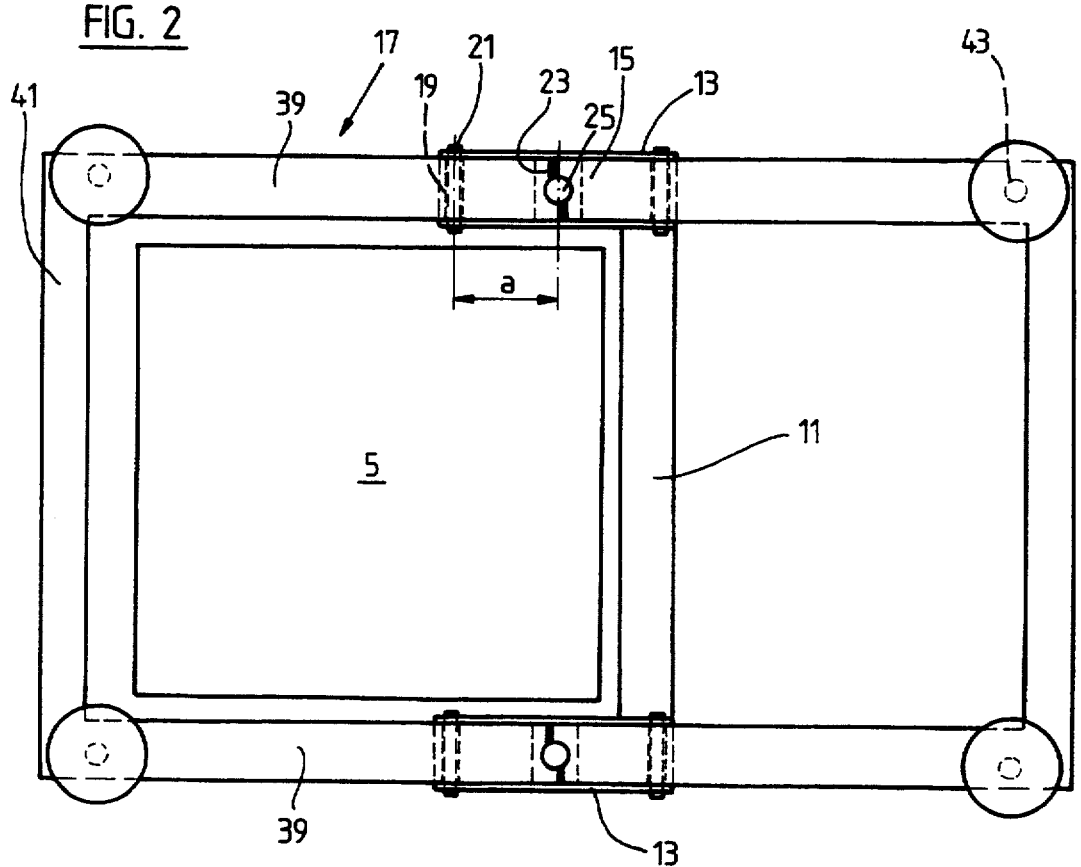
FIG. 2 is a top view of the balance of FIG. 1 showing the U-shaped frame members and the yoke supporting the frame members.
Figure 3:
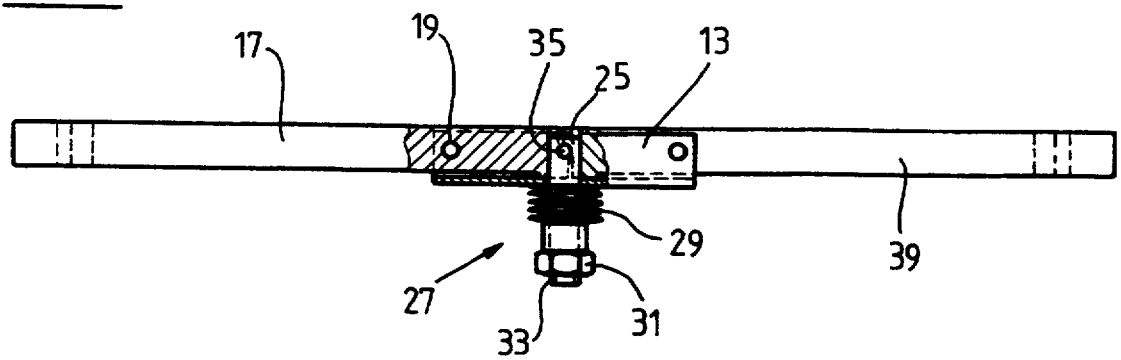
FIG. 3 is a cross-sectional view of the abutment of the balance with the side arms of the frame members acting on the abutment.
Figure 4:
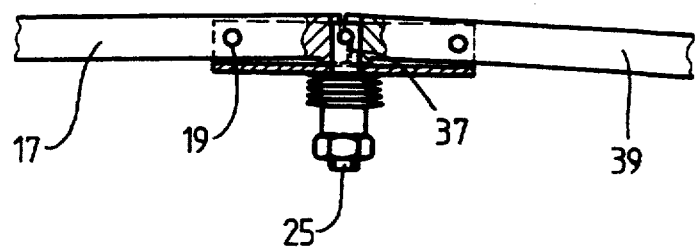
FIG. 4 is a sectional view, similar to FIG. 3, showing the frame members under load.

As shown in FIG. 2, bores 19 are provided in the arm ends 15 at a distance a from the end faces thereof. Bearing pins 21 engage in the bores 19. The ends of the bearing pins 21 are supported in the swivel bearings 13. The end faces 23 of the arm ends 15 are located opposite each other and spaced apart from each other by a small distance and engage around the pull rod 25 of an abutment 27. The pull rod 25 is axially slidably guided in the swivel bearing 13 and projects from the underside of swivel bearing 13. The pull rod 25 forms a coupling means for the two levers 17.

Figure 6:
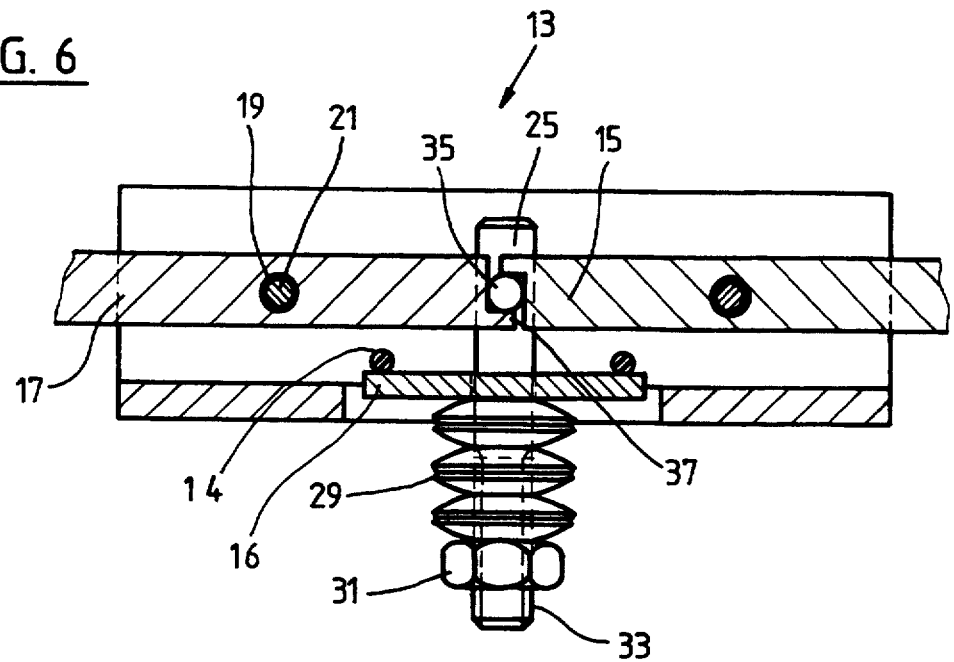
FIG. 6 is a longitudinal sectional view taken through the swivel beating along sectional line VI—VI in FIG. 7.
Figure 7:
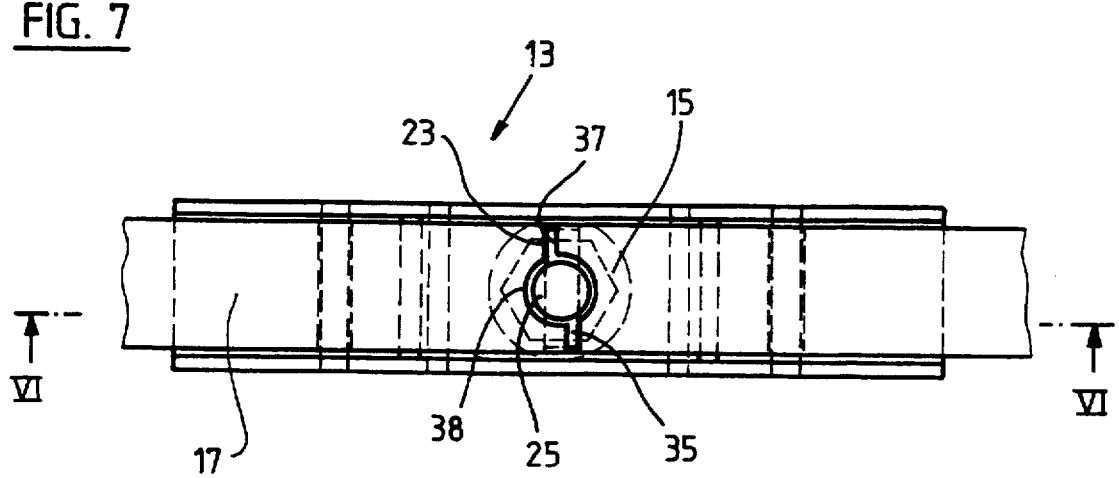
FIG. 7 is a top view of the swivel bearing of FIG. 6.

A stack of springs 29 rests from below against the swivel bearing 13, for example, against an annular disk 16 which is supported by two pins 14 which are mounted stationary in the swivel bearing 13. A tightening nut 31 mounted on a thread 33 of the pull rod 25 pretensions the springs 29. A radially extending abutment bolt 35 extends through the upper end of the pull rod 25. The abutment bolt 35 has the purpose of serving as a contact surface for a projection 37 provided at the end faces 23 of the arm ends 15. In order to achieve a contact with little play, the projections 37 have at their surfaces which contact the abutment bolts 35 a radius 38 which is the same as the radius of the abutment bolt 35, as can be seen in FIG. 7 of the drawing. Each arm end 15 is preferably provided with a projection 37 which acts on the one side of the pull rod 25 at least from below on the abutment bolt 35, wherein the projections 37 are arranged in such a way that, as can be seen in FIGS. 2, 6 and 7, the two U-shaped levers 17 are constructed equally, i.e. equal components for both frame halves.

Together with a cross member 41 of the lever 17 which forms a base, the two arms 39 of the lever 17 form, as seen in relation to the load range of the balance, a bending-stiff and twisting-resistant frame component. Bores 43 are provided at the corners of the frame component for fastening a mushroom-shaped dampening element 45 each. The weighing dish 9 is placed on the four dampening elements 45 either directly or on a weighing dish support member.

The two levers 17 and the yoke 11 are located on the side of the weighing cell 5 and surround the weighing cell 5. When loads are weighed which are within the weighing range and are not dropped onto the weighing dish 9, the force F is transmitted from the weighing dish 9 through the four dampening elements, which may be of rubber or a corresponding elastic plastics material, to the levers 17, the abutments 27 on the yoke 11 and from there onto the load receiving means 7. Accordingly, in the normal case, the system operates as an inherently rigid body.

On the other hand, if a load F, which may be within or without the weighing range of the balance 3, is dropped on the weighing dish 9, initially the dampening elements 45 are compressed and subsequently a synchronous pivoting of the two levers 17 about the bearings at the beating pins 21 takes place. As a result of the pivoting movement of the two levers 17, the projections 37 at the arm ends 15 lift the abutment bolts 35 and, thus, the pull rod 25. This causes the stack of springs 29 to be compressed and at least a portion of the force F introduced into the system is absorbed by the springs 29. When an excess load is introduced, always both levers 17 are pivoted, independently of whether the force F acts on the system in the center of the weighing dish 9 or at the edge thereof. This is because the levers 17 are very stiff with respect to bending and are coupled to each other in the abutment 27.

Figure 5:
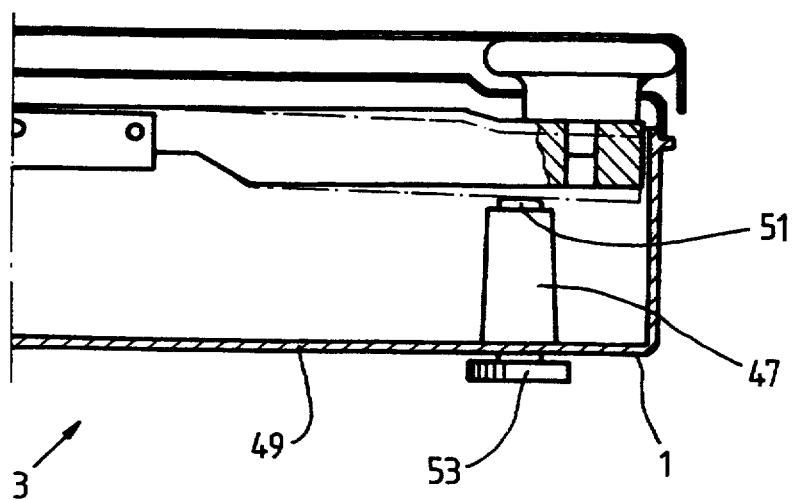
FIG. 5 is a sectional view of a portion of the balance with the overload stop member.

If the excess load exceeds the overload range determined by the stack of springs, the levers 17 come into contact with a stop pedestal 47, shown in FIG. 5, which is mounted in the area of the dampening elements 45 and is placed either directly on the bottom 49 of the housing 1 or is integral component thereon. An elastic buffer 51 may be placed on the upper surface of the pedestal 47 for dampening the impact of the lever 17. If the pedestal 47 is mounted directly above the legs 53 of the balance 3, the excess load can be introduced directly onto the support surface for the balance; this avoids a mechanical load on the housing 1.

It should be understood that the preferred embodiments and examples described are for illustrative purposes only and are not to be construed as limiting the scope of the present invention which is properly delineated only in the appended claims.

What is claimed is:

1. A balance with a weighing system protected against overloading comprising a weighing cell, a load receiving means acting on the weighing cell, the weighing cell having a side, a weighing dish placed on the load receiving means, two pivotable U-shaped levers having pairs of arms with inner and outer ends, the levers supporting the weighing dish and at least partially extending on the side of the weighing cell, the outer ends of the lever arms contacting the weighing dish from below, at least one vertically displaceable abutment receiving the inner ends of the lever arms, a pre-tensioned spring means having a spring force for biasing the at least one abutment such that the levers are pivoted when an excess load is placed on the weighing dish and the levers overcome the force of the spring and form a parallel guide means for the downwardly moving weighing dish, the two levers forming inherently rigid frame members and being mounted such that the ends of the lever arms of the two levers are located opposite each other, a yoke member having swivel bearings, axes being fastened in the swivel bearings, the axes being located at a predetermined distance from the inner ends of the arms, the levers being connected to the yoke so as to be pivotable about the axes fastened in the swivel bearings.

2. The balance according to claim 1, comprising an abutment each between the two oppositely located inner ends of the pairs of levers.

3. The balance according to claim 2, wherein the yoke has a central portion and two ends, one of the abutments being placed in the swivel bearings on each end of the yoke, and the central portion of the yoke being placed on the load receiving means.

4. The balance according to claim 2, wherein each abutment comprises a pull rod having an upper end, an abutment bolt being inserted in the upper end of each pull rod, the inner ends of the lever arms acting on the abutment bolts, each pull rod further having a lower end provided with a thread, a tensioning knot for tensioning the spring means being mounted on the thread.

5. The balance according to claim 4, wherein each pull rod is axially slidably guided in the abutment, the inner ends of the lever arms having projections, the projections engaging the abutment bolts at least from underneath.

6. The balance according to claim 1, comprising dampening elements mounted at the outer ends of the lever arms.

7. The balance according to claim 6, wherein the dampening elements are mushroom-shaped.

8. The balance according to claim 1, comprising stop pedestals mounted underneath the outer ends of the lever arms, the balance having a housing including a housing bottom, the stop pedestals being mounted on the bottom of the balance housing.

9. The balance according to claim 8, wherein legs are attached to the bottom of the balance housing, the stop pedestals being mounted above the legs.

* * * * *